Sept. 15, 1964 W. K. BENDER 3,148,573

NOTCHING DEVICE FOR SOUND RECORD CARRIER

Filed Feb. 8, 1961 2 Sheets-Sheet 1

INVENTOR.
WERNER K. BENDER
BY Hane and Nydick
ATTORNEYS

NOTCHING DEVICE FOR SOUND RECORD CARRIER

Filed Feb. 8, 1961

INVENTOR.
WERNER K. BENDER
BY
ATTORNEYS

United States Patent Office 3,148,573
Patented Sept. 15, 1964

3,148,573

NOTCHING DEVICE FOR SOUND RECORD CARRIER

Werner K. Bender, Plainville, Conn., assignor to The Kalart Company Inc., Plainville, Conn.

Filed Feb. 8, 1961, Ser. No. 87,927
12 Claims. (Cl. 83—235)

The present invention relates to a marking device for marking a carrier bearing one or several pairs of a picture area and a sound record area formed on the carrier, and more particularly, to a marking device for notching or punching a strip of motion picture film bearing alternately picture areas and sound record areas longitudinally spaced on the strip either in one or two parallel rows.

There are known film strips on which are printed or otherwise produced a sequence of programs each comprising a picture area and a sound record area on which is recorded a message pertaining to the picture area of the program. The picture area and the associated sound record area need not be directly adjacent. In actual practice, the two associated areas are more often than not separated by one of several areas belonging to other programs. Furthermore, the areas allotted to the pictures and the areas allotted to the sound records need not be alike, either one of the two areas may occupy more space on the film than the other. Each message is recorded on the sound record area allotted to it in the form of parallel track sections slanted in reference to the longitudinal edges of the film. The track sections are so recorded that the end of one section and the beginning of the next adjacent section in the direction of the playback constitute a continuation of the recorded message. To effect a smooth and continuous transition from one track section to the next one, each track section may have at its end a fadeout portion and at its beginning a fade-in portion. While often both the picture and the sound record are photographically printed and the sound track is optically scanned, the sound may also be magnetically recorded on an appropriately coated record area, or it may be printed with magnetic ink.

Carriers such as film strips of the kind above referred to, or rather the programs thereon, are designed to be projected or viewed and reproduced, respectively, by sound projectors in which the carrier is held stationarily during the presentation of a program and is transported into position for the presentation of another program upon completion of the preceding one. The transport mechanism is activated by signal means provided on the carrier and rendered effective when the end of a presentation is reached. The signal means may be of electronic nature such as a recorded frequency signal which is generated when the presentation is completed and which operates appropriate responsive equipment, or the signal means may be of mechanical nature and consist of a physical marking such as a notch or hole in the film, which notch or hole at the end of a presentation is engaged by suitable mechanical or electrical components such as contact fingers. Engagement of the components probing the film for a notch or a hole then activates the transport mechanism of the projector. The present invention relates to mechanical signal means, and more specifically, to a device for applying a marking in the form of a notch or a hole to the film.

Sound projectors and films of the kind above referred to, are more fully described in co-pending application Serial No. 809,043 filed April 27, 1959, Patent No. 3,001,444 patented September 26, 1961.

One of the problems involved in the application of markings to a carrier such as a film strip is to ascertain the correct locations for such markings. The track recorded on a sound record area may, of course, occupy the entire area allotted to it, but frequently it occupies only a fraction of the available total area and that fraction may be, and often is, different for each area. As a result, the markings cannot be uniformly spaced, but the correct location thereof must be specifically determined for each sound record area. Theoretically, it is possible to determine the correct locations by listening one or several times to each message and then marking the film accordingly. However, such procedure is not feasible for economic reasons. In practice, each film may contain a number of record areas and usually does, and a substantial number of copies of the same film may have to be marked. Obviously, the time required for the individual marking of each copy would be prohibitive.

It is a broad object of the present invention to provide a marking device by means of which sound record carriers of the kind above referred to, can be rapidly and accurately marked in accordance with the lengths of each of the several messages recorded thereon.

A more specific object of the invention is to provide a novel and improved marking device which effects marking of a strip of film of the kind above referred to, while the same is transported through or past the device, thus permitting processing of film of any length at any desired rate of transport.

Another more specific object of the invention is to provide a novel and improved marking device, including means compensating for the transport of film during the actual marking thereof, thereby preventing tearing of the film by the action of the cutting or punching means of the device.

Still another more specific object of the invention is to provide a novel and improved device which permits marking of several films simultaneously under the control of an indexed master film or tape.

It is also an object of the invention, allied with the preceding ones, to provide a novel and improved indexing means for conveniently and accurately determining the correct locations of the markings such as notches or holes, on the film to be marked. A film thus indexed may then be used as master film for marking copies of the master film.

Other and further objects, features and advantages of the invention will be pointed out hereinafter and set forth in the appended drawings constituting part of the application.

In the accompanying drawing several embodiments of the invention are shown by way of illustration and not by way of limitation.

In the drawing:

FIG. 5 is a diagrammatic view of a marking device according to the invention combined with the sound printing station of a printing machine for printing film of the kind herein referred to.

FIG. 6 is a plan view showing the marking of a film under the control of an indexed master tape or film.

FIG. 7 is a diagrammatic view of a marking device according to the invention in conjunction with a machine for canning marked films, and FIG. 8 is a circuit diagram of the control system for the installation according to FIG. 7.

Figure 1:
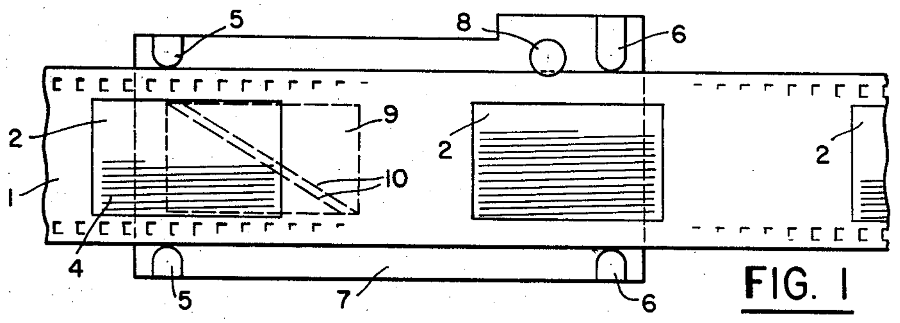
FIG. 1 is a plan view of an indexing device or gauge according to the invention.

Referring first to FIG. 1, this figure shows as carrier part of a strip 1 of motion picture film on which are printed for instance, by photographic printing sound record areas 2. Two complete areas and a fractional area are shown, but it should be understood that any number of areas may be provided on the film. The sound record areas may, and generally do, alternate with picture areas which are not shown since they are not essential for the understanding of the invention, but should be visualized as being disposed in the space between each two sound record areas. A message is recorded on each record area in the form of a plurality of track sections 4 which are parallel to each other and generally slightly slanted in reference to the longitudinal edges of the film. As is shown, the sound tracks of the three record areas occupy different fractional portions of the respective available total area. Of course, the sound track may also occupy the entire available area.

As previously explained, a sound film strip as shown in FIG. 1 is intended for play-back in a sound projector while being stationary and the film is and should be transported for play-back of another message as soon as one message is completed. Obviously, messages of different lengths require different periods of time for play-back, and as a result, it is not possible to provide a fixed period of time during which the film remains stationary. As also previously explained, transport of the film is initiated by engagement of a marking such as a notch or a hole in the film with appropriate components of the projector. For the above explained reasons, the markings on the film initiating the transport thereof cannot be all located at the same distance from the respective sound record area, but the location of each marking must be determined in accordance with the length of the message recorded on the respective sound record area.

To facilitate the determination of the marking for each sound record area, the film is guided between pairs of guide posts 5 and 6 provided on a guide plate 7. These posts guide the film along a plane straight path. Film movement can be effected either by hand or by a suitable drive means. Plate 7 mounts a marking means 8 indicated in FIG. 1 by a circle. The marking means may be a punch or a notching device as will be more fully described hereinafter. The plate 7 further includes a translucent or transparent window 9 which underlies the film. On this window indexing means, shown as two parallel diagonal lines 10, are provided. The positions of the indexing lines and of the marking means are so correlated that operation of the marking means marks film 1 at the correct location for a message on a sound record area, say, the left hand sound record area, when film 1 is placed in a position such that the end of the last track section is located at the intersection with the indexing lines, assuming that the message is recorded from the bottom line on upwards. This position of the film is shown in FIG. 1. As is apparent, the determination of the marking as obtained by the aforedescribed procedure is not entirely accurate, since there is a further fractional track section which is ignored. In respect to such fractional track section the operator may exercise somewhat his discretion. If the fractional track section is less than half of the full length as shown, it may be ignored, and if it is more than half it may be extrapolated to the end of the record area, and the indexing lines are then set for the extrapolated track section. In any event, the determination of the marking readily obtainable by the described procedure is sufficiently accurate for all practical purposes.

After marking the entire strip of film, the same is ready for reproduction. If the marked film is the only one of its kind, the desired marking procedure is adequate, but if a number of copies of the same film must be marked, the described procedure may be too cumbersome and time-consuming. In the event a number of identical films are to be marked, the film after being marked as described in connection with FIG. 1 may be used as a master film, or a control or master tape may be prepared from the original marked film.

Figure 2:
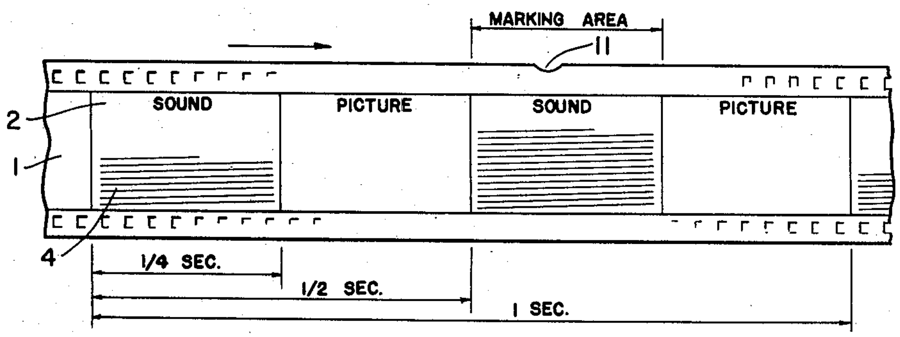
FIG. 2 is a fragmentary view of film marked by means of the gauge according to FIG. 1.

In actual practice it is generally required for economic reasons that the marking operation is coupled with another step such as the printing of the sound record areas and the picture areas on the film in a printing machine. Coupling of the marking operation with the printing operation involves movement of the film at rather considerable speed. FIG. 2 which shows a film marked with notches 11, indicates the speed of the film movement generally involved when the marking operation is coupled with a printing operation or a film finishing operation.

A film coming from a printing machine or a finishing machine generally travels two programs per second; that is one picture frame and one sound frame pass the marking means within one-half second. Accordingly, for 35 mm. film three inches of film will move past the marking means. The distance between two markings for the shortest and the longest sound message is about 1.5″. Hence, one-quarter of a second is the time during which the marking device must be readied for the next marking operation. Assuming that the marking operation is completed in a very short period of time, for instance, 1/1000 of a second, the film will travel in that time 0.006″. Such distance of travel of the film, while very short, may nevertheless affect the marking operation and may also result in a certain tearing of the film.

Figures 3, 4:
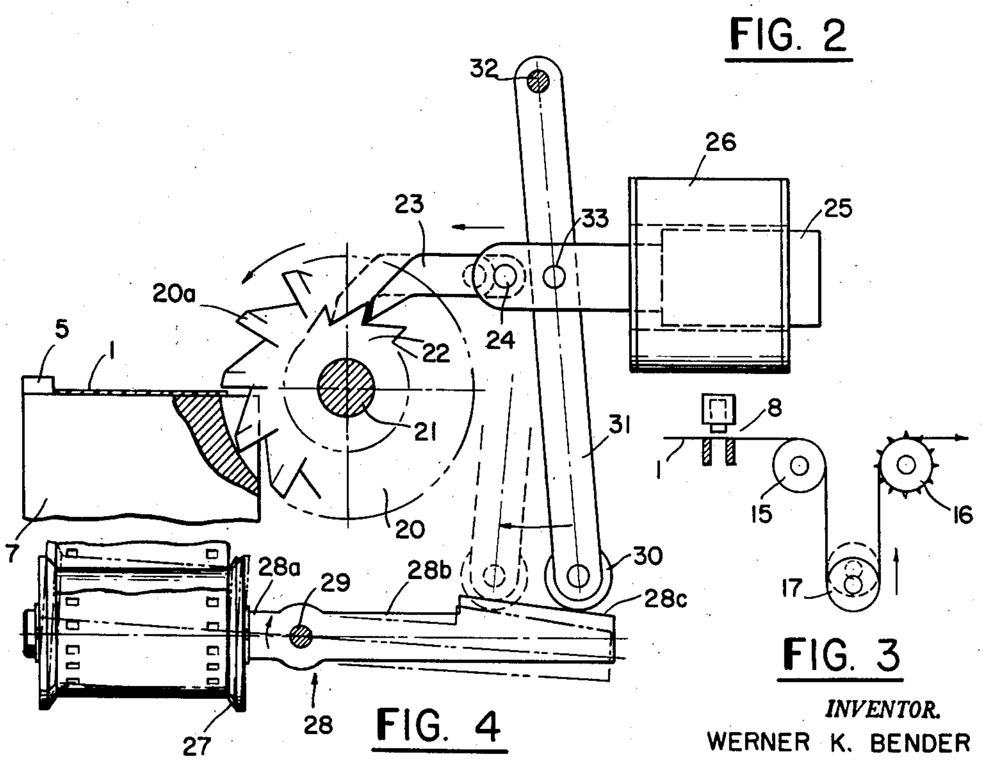
FIG. 3 shows diagrammatically the means compensating for the travel of the film during a marking operation.
FIG. 4 is an elevational view, partly in section, of a marking device according to the invention.

Accordingly, the invention provides compensating means which retard the transport of the film during the marking operation sufficiently to compensate for the travel of the film during such operation. Such compensating means are schematically shown in FIG. 3. According to this figure, the marking means 8 is indicated as a punch, but a notching device may, of course, also be used. Film 1 which is traveling in the directed indicated by an arrow, is guided over a wheel 15, a sprocket 16 and a guide member 17 to form a loop. Guide member 17 is movable between the full line position and the dotted line position thereby correspondingly varying the depth of the loop. Member 17 is lifted simultaneously with the marking operation from the full line position into the dotted line position thereby correspondingly shortening the length of the loop. As a result, film 1 is temporarily slackened and its movement past the marking means is practically stopped until the slack caused by the lifting of guide member 17 is taken up. In other words, the marking operation proper is carried out when and while the film portion in position for marking by actuation of marking means 8 is practically at a standstill.

FIG. 4 shows in detail a marking device including cutting means and also compensating means. The film is shown guided on guide plate 7 and should be visualized as moving normal of the plane of the drawing. The cutting means comprises a cutting wheel 20 having saw teeth 20*a* and is seated on a rotary shaft 21. The shaft also seats a ratchet wheel 22 for rotation in unison with the cutting wheel. Rachet 22 is actuated by a pawl 23 which is linked at 24 to the core 25 of a solenoid coil 26.

The compensating means comprise a sprocket 27 corresponding in function to the previously described guide member 17. Sprocket 27 is mounted on arm 28*a* of a two-arm lever 28 pivotal about a pivot 29. The other arm 28*b* of the lever forms a camming surface 28*c*. The camming surface coacts with a cam follower 30 rotatably mounted on an arm 31 pivotal about a pivot 32 and also pivotally linked to core 25 at 33.

The core and the parts 23, 31, coupled thereto, are shown in the positions they occupy when coil 26 is de-energized. In response to each energization of the coil causing attraction of the core towards the left, both the pawl and arm 31 are moved from the full line position into the dotted line position. As a result, cutting wheel 20 is turned through an angle causing the respective one of its teeth to cut a notch in the film and the cam follower lifts sprocket 27, thereby shortening the film loop as described in connection with FIG. 3 and correspondingly retarding the transport of the film during the notching operation.

The control of the energization of coil 26 will be described hereinafter.

Figures 5, 6, 7, 8:
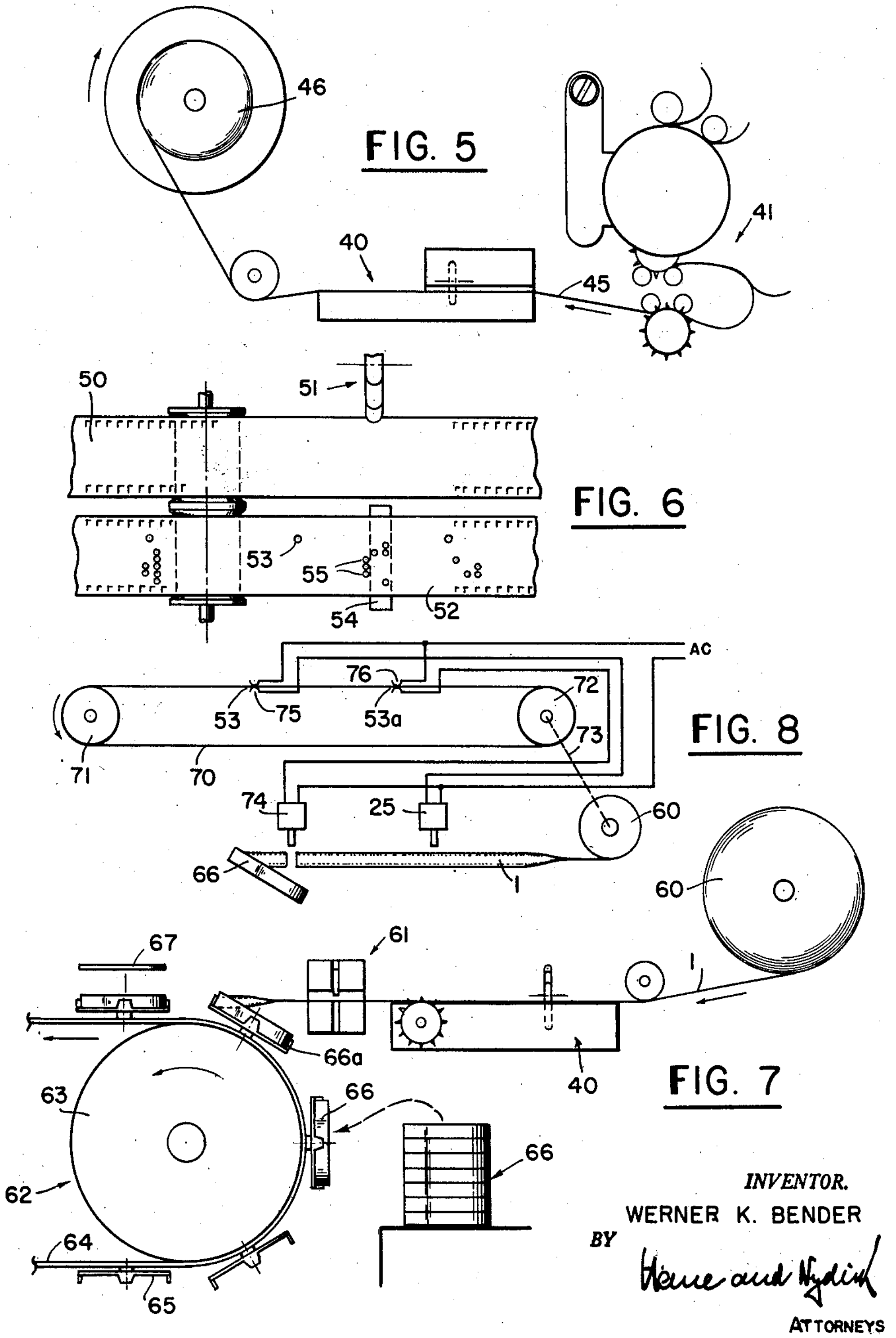

FIG. 5 shows a marking device generally designated 40 combined with the sound printing station of a printing machine generally designated by 41. The marking device should be visualized as comprising cutting means and compensating means of the kind previously described. Printing machines of the kind diagrammatically indicated in part in FIG. 5 are more fully described in copending application, Serial No. 30,314, filed May 19, 1960, now Patent No. 3,094,057. Since the printing machine does not constitute part of the invention it suffices to state that film 45 emerging from the sound printing station of the machine is fed to the marking device 40 and then wound upon a takeup reel 46.

FIG. 6 shows the marking of a film 50 having printed thereon sound record areas of the kind previously described. A marking device is indicated at 51 to effect notching of the film at locations correlated with the length of the message recorded on the associated sound record area. The operation of the marking device which amy be visualized as being of the kind described in connection with FIG. 4, is controlled by signals on a control tape 52. The signals are shown in the form of holes 53 which are probed by a sensing means 54 and are so longitudinally spaced that the marking device will be actuated for a one-step operation at the appropriate spacings on the film. Control circuit means suitable for the purpose of the invention will be more fully described in connection with FIG. 8. Tape 52 is shown as being provided with additional signal holes 55 which may be visualized as constituting signals conveying information for maintaining light and color balance, or other information which may be desirable in connection with the finishing of the film.

To simplify the illustration, only one film is shown as being controlled by means of tape 52. However, as is readily apparent, any desired number of films to be marked may be controlled simultaneously by means of a single control tape.

The control tape may be prepared by punching the tape in accordance with the location of the markings obtained by the procedure described in connection with FIG. 1. The tape may be made of any suitable material. For instance, waste film may be used and the tape may be arranged in the form of an endless loop driven by a suitable means. While the tape has been shown as being indexed by punched holes, a magnetic control tape may, of course, also be used. Furthermore, the original film marked as described in connection with FIG. 1 may be used as control or master tape.

FIG. 7 shows an installation in which film 1 is fed from a supply reel 60 to a marking device 40 as previously described and then past a cutting station 61 to a film canning machine 62 of conventional design. The canning machine comprises a drum 63 over which is guided a conveyor 64 mounting suitably spaced can holders 65 in which cans 66 are inserted. The marked film is wound in these cans in a conventional manner as is indicated for can 66*a*. When a can is filled, the cutting station 61 cuts off the film. The can is finally closed by applying a lid 67 thereto. The step-by-step drive of the can conveyor and the timing of the drive are not described in detail since they do not constitute part of the invention and are well known in the art.

Turning now to FIG. 8, this figure shows a circuit system for control of the marking device 40 and the cutting station 61 of FIG. 7. According to FIG. 8 a control tape 70 of the kind described in connection with FIG. 6 is driven over pulleys 71 and 72 in the form of an endless loop. The rate of travel of the control tape is synchronized with the rate of travel of film 1 as is indicated by the linkage 73 between pulley 72 and reel 60. Tape 70 should be visualized as being punched with two transversely spaced rows of holes 53 and 53*a*, respectively, holes 53 controlling the energization of solenoid coil 25 (see FIG. 4) and holes 53*a* controlling the energization of a solenoid 74 for actuating the cutting station 61. The holes 53 are probed by contact fingers 75 and holes 53*a* by contact fingers 76. The contact fingers are normally separated by the tape material but engage each other when in registry with a hole. As is evident, engagement of either pair of contact fingers closes an energizing circuit for the respective solenoid coil 25 or 74 until the contact fingers are again separated by the continued travel of the control tape.

As is evident, the circuitry as shown in FIG. 8 may also be used for control of sensing means 54 or the installation shown in FIG. 5 though simplified by eliminating the solenoid for control of the cutting station.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A marking device for cutting marginal notches in a plane elongated carrier carrying several sound record areas each bearing a sound track in the form of parallel sound track sections, said device comprising guiding and transport means for continuously moving the carrier along a plane path; marking means stationarily disposed adjacent to the path of the carrier and including a step-by-step operable toothed cutting wheel mounted rotatably in a plane transverse of the plane of the carrier, the teeth of said wheel being engageable with one lengthwise edge of the carrier, rotation of the wheel through one step moving one of the teeth of the wheel through the plane of the carrier, thereby notching said edge thereof; and actuating means coacting with said marking means for rotating the cutting wheel thereof through one step upon each operation of the actuating means.

2. A marking device for cutting marginal notches in a plane elongated carrier carrying several sound record areas each bearing a sound track in the form of parallel sound track sections, said device comprising guiding and transport means for continuously moving the carrier along a plane path; marking means stationarily disposed adjacent to the path of the carrier and including a step-by-step operable toothed cutting wheel mounted rotatably in a plane transverse of the plane of the carrier, the teeth of said wheel being engageable with one lengthwise edge of the carrier, rotation of the wheel through one step moving one of the teeth of the wheel through the plane of the carrier, thereby notching said edge thereof; compensating means delaying movement of the carrier past said marking means during the cutting of a marking; and actuating means coacting with said marking means for rotating the cutting wheel thereof through one step upon each operation of the actuating means.

3. A marking device for cutting marginal notches in a plane elongated carrier carrying several sound record areas each bearing a sound track in the form of several parallel sound track sections, said device comprising guide and transport means for continuously moving the carrier along a plane rectilinear path at a predetermined constant rate of speed; marking means stationarily disposed adjacent to the path of the carrier and including a step-by-step operable toothed cutting wheel mounted rotatable in a plane transverse of the plane of the carrier and interengaging with one edge thereof, rotation of the wheel through one step moving one of the teeth of the wheel through the plane of the carrier thereby notching the carrier; actuating means coacting with said marking means for rotating the cutting wheel thereof through one step in response to each operation of the actuating means; and control means operating said actuating means at predetermined intervals of movement of said carrier on the guiding and transport means.

4. A marking device for cutting marginal notches in a strip of motion picture film having printed thereon several sound record areas each having recorded thereon a sound track in the form of parallel track sections, said device comprising guide means for guiding the film along a straight path, drive means for continuously transporting the film along said path at a predetermined rate of speed, marking means stationarily disposed adjacent to said path, said marking means including a step-by-step operable toothed cutting wheel mounted rotatably in a plane transverse of the plane of the carrier, the teeth of said wheel being engageable with one lengthwise edge of the carrier, rotation of the wheel through one step moving one of the teeth of the wheel through the plane of the carrier, thereby notching said edge thereof; and actuating means operating said cutting wheel for a one-step cutting operation at predetermined distances of travel of the film in reference to said marking means, the distance between each two cutting operations corresponding to the fractional area occupied by the sound track on a respective sound record area.

5. A marking device according to claim 4 wherein said marking means further include compensating means retarding when operated the transport of the film portion into a position for a one-step cutting operation by said cutting wheel, said compensating means being operated by said actuating means substantially simultaneously with said cutting wheel.

6. A marking device according to claim 3 wherein said control means comprise a driven control tape indexed with signals spaced lengthwise in accordance with said predetermined distances, and wherein said marking means further comprise actuating means responsive to said signals to rotate said cutting wheel for a one-step operation in response to a signal.

7. A marking device according to claim 6 wherein said actuating means comprise electromagnetic means which when operated actuate said cutting wheel for a one-step operation and wherein said control tape includes signals in the form of apertures in the tape and said electromagnetic means are connected in an energizing circuit including a pair of relatively movable switch contacts normally electrically separated from each other by said tape and engaging each other when and while in engagement with one of said apertures thereby controlling said energizing circuit for operating said electromagnetic means.

8. A marking device according to claim 7 wherein said marking means further include compensating means comprising a film guide means movable between a first position guiding the film through a path of predetermined length and a second position guiding the film through a path of shorter length, said guide means being disposed posterior of said cutting wheel in the direction of the transport of the film and being coupled with said electromagnetic means for movement by the same from said first position into said second position in response to each energization of said electromagnetic means, movement of the movable guide means into said second position retarding the transport of the film portion in position for a cutting operation by the cutting wheel.

9. A marking device according o claim 8 wherein said movable guide means comprises a guide wheel guiding the film through a loop of shorter length in the second position of said guide means than in the first position thereof, a pivotally mounted two-arm lever, one arm of said lever supporting said wheel and the other having a camming surface, and a cam follower coacting with said camming surface, and wherein said electromagnetic means comprises a solenoid coil connected to said energizing circuit and a movable core coupled with said cutting wheel and linked to said cam follower for causing the latter to pivot said guide wheel into its second position during each energization of the coil.

10. A marking device according to claim 3 and further comprising a pawl and ratchet assembly, said ratchet being mounted for rotation in unison with said cutting wheel and said pawl being drivingly coupled with said actuating means to effect turning of the cutting wheel through one step in response to each actuation of the actuating means by said control means.

11. A marking device according to claim 10 wherein said control means comprise a driven control tape indexed with signals spaced lengthwise in accordance with said predetermined distances, and wherein said marking means comprise actuating means responsive to said signals and coupled with said pawl to actuate the same for turning of the ratchet through an angle causing turning of the cutting wheel by one step upon each operation of the actuating means by a signal.

12. A marking device according to claim 11 wherein said actuating means comprise electromagnetic means which when operated actuate said pawl to effect a turning of the cutting wheel through one step, and wherein said control tape includes signals in the form of apertures in the tape and said electromagnetic means are connected in an energizing circuit including a pair of relatively movable switch contacts normally electrically separated from each other by said tape and engaging each other when and while in engagement with one of said apertures thereby controlling said circuit for operating said electromagnetic means.

References Cited in the file of this patent

UNITED STATES PATENTS

| | | |
|---|---|---|
| 1,192,132 | Spiegel | July 25, 1916 |
| 1,425,405 | Miller et al. | Aug. 8, 1922 |
| 1,494,593 | De Pue | May 20, 1924 |
| 1,612,971 | Freeburg | Jan. 4, 1927 |
| 1,859,091 | Hoxie | May 17, 1932 |
| 1,954,349 | Dewey et al. | Apr. 10, 1934 |
| 2,260,223 | Harper | Oct. 21, 1941 |
| 2,291,668 | Weigolt | Aug. 4, 1942 |
| 2,655,212 | Stewart | Oct. 13, 1953 |
| 2,674,308 | Knobel | Apr. 6, 1954 |
| 2,783,842 | Mainardi et al. | Mar. 5, 1957 |
| 2,898,995 | Funnell | Aug. 11, 1959 |
| 2,983,355 | Taperell | May 9, 1961 |